Aug. 21, 1934. A. E. LARSEN 1,971,043
AIRCRAFT WING, PARTICULARLY OF THE ROTATIVE TYPE
Filed March 23, 1933   2 Sheets-Sheet 1

INVENTOR
Agnew E. Larsen
BY
Synnestvedt Lechner
ATTORNEYS

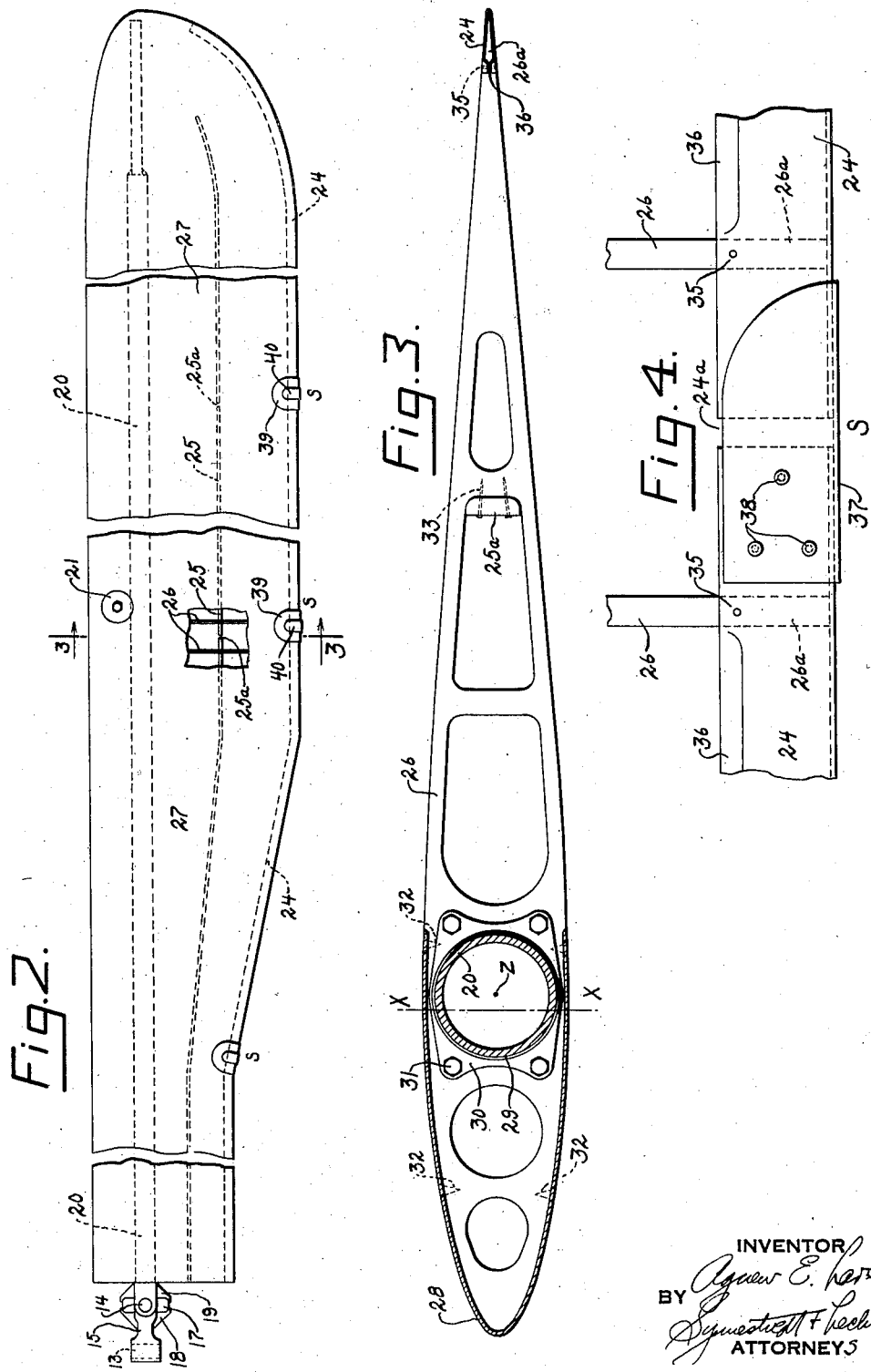

Patented Aug. 21, 1934

1,971,043

UNITED STATES PATENT OFFICE 1,971,043

AIRCRAFT WING, PARTICULARLY OF THE ROTATIVE TYPE

Agnew E. Larsen, Huntingdon Valley, Pa., assignor to Autogiro Company of America, Willow Grove, Pa., a corporation of Delaware Application March 23, 1933, Serial No. 662,193

11 Claims. (Cl. 170—164)

This invention relates to aircraft wing construction, is especially useful in rotative sustaining wings, and is particularly adapted to accomplish certain novel and useful results in aircraft rotors the wings of which are swingingly or oscillatively mounted, preferably for individual displacements, on an upright axis in position to be aerodynamically turned or autorotated by the relative flight wind which is induced either by the translational movement of the aircraft under the influence of some means of forward propulsion or by the steep or vertical descent of the aircraft, with or without power.

In an aircraft of the type last mentioned, especially in high speed forward flight, when the rotor, considered as a whole, is moving substantially edgewise through the atmosphere, or with its real or virtual axis inclined slightly rearwardly from the vertical, each wing is subjected not only to a variable air pressure and thus variable lift as it advances and retreats, during its rotation, with respect to the line of flight, but also, since its autorotation is due to a component (acting forwardly in the direction of rotation) of the lifting reaction, it is subjected to variable forces in the general plane of rotation, which may be called drag and acceleration. Likewise, the pressure loading at a given point on the wing varies as the wing rotates, the relative pressure on different portions of the wing varies, and the location of the center of pressure varies, especially in a direction longitudinally of the wing.

In addition to the foregoing, such a wing is subjected to variable centrifugal forces, variable in amplitude according to the rotational speed of the wing, and variable in direction or angle according to the swing or oscillating movements of the wing on its mounting pivot or pivots. Furthermore, since such a wing is usually of very long and narrow construction and considerable mass (the length of an individual wing sometimes being as much as 25 feet and its weight as much as 90 pounds), considerable strains are imposed upon the wing when starting the same by a power starting device prior to take-off, and when stopping the same by the rotor brake, after landing; and this is quite marked, with some of the rotor starters and brakes now in use, which are capable of bringing such a rotor from 0 r. p. m. to about 120 r. p. m., or vice versa, in approximately 30 seconds.

The present invention is primarily intended to protect the wing construction against deleterious effects of forces such as above discussed.

In general, the invention contemplates a wing construction of high aspect ratio, having mounting mechanism at the root end of the wing constituting its major means of support or its primary securing means, in which the forward or thickened portion of the wing constitutes or embodies the major backbone or strengthening structure thereof, the thinner or trailing portion thereof being connected with and at least to an appreciable extent carried or supported by said main longitudinal strength structure, and in which there is provided means, such as one or more joints or cuts in the rear or trailing portion of the wing, adapted to accommodate flexure of the wing occurring in the general plane thereof, whereby to avoid objectionable buckling or bending of the wing surfacing or of the trailing edge, as by concentrating the effects of wing flexure at one or more localized points.

More specifically, in a rotary or autorotative wing, wherein the mounting of the wing is advantageously accomplished by means of one or more pivots at the root end, to which the main wing spar is connected, the wing, while constructed to have considerable flexibility transversely of its general plane, is stiffened as against flexure in its plane, for instance by means of a box-like or girder construction, such as a plated or stiffened nose or leading edge portion, whereas the rear or trailing edge portion is preferably supported at least in part by or even built up entirely upon said main spar, as by means of a plurality of transverse ribs, carrying the surfacing such as fabric, which ribs are interspaced by longitudinal stringers, having cuts or slip-joints at intervals along their length. Since the main longitudinal strength structure of such a wing, which may take the form of a single main longitudinal tubular spar, is normally located close to the leading edge or spaced therefrom but a small fraction of the total chord, and since the neutral axis of resistance in the plane of rotation customarily lies even forwardly of the center line of said tubular spar, and further since the longitudinal stringers, paralleling the spar, in order to keep the center of gravity approximately on the spar are made of quite light construction and are thus incapable of carrying heavy loads longitudinally, it will now be seen that even though the wing is made quite stiff as against bending in its own plane, yet any slight bending which takes place at the spar is amplified to a considerable degree at the trailing edge and is not capable of being adequately resisted by such light stringer and trailing edge members. To accommodate this, and also to prevent rippling of the fabric (which is much more detrimental in this type of wing than in an ordinary fixed wing, since this type of wing during rotation, in forward flight, meets the air at widely differing angles with relation to a line perpendicular to the leading edge, and it is important that a good aerofoil contour be presented at all such angles, for efficient autorotational lift) the magnified bending or telescoping tendency at and adjacent the trailing edge is cared for or localized by means preferably comprising a series of slip-joints in the trailing edge strip and a plurality of cuts or gaps in the intermediate stringer, suitable covers or patches being placed over the joints.

Thus the invention contemplates the minimizing and localizing of wrinkles or warping of the wing surfacing or of the trailing edge, and relieving the light stringers and the trailing edge strips of any tendency to bend or break, while at the same time maintaining the proper interspacing of the ribs and the smooth and uniform support of the wing surfacing or fabric over the contour of the wing as a whole.

How the foregoing difficulties are avoided and advantages obtained, together with such other advantages as may be incident to the invention, will be clear from the following description, taken in the light of the accompanying drawings, in which drawings:

Figure 2 is an enlarged plan view of one of the rotative wings of the aircraft, portions of the wing being broken out, although it will be understood that, if shown complete, this wing would be more than three times the length shown in this figure, in proportion to its chord;

Figure 3 is a still further enlarged cross sectional view through the wing of Figure 2, taken approximately on the line 3—3 of Figure 2, and with the exterior wing covering, or fabric, removed; and Figure 4 is a detailed fragmentary plan view of the trailing edge of the wing of Figure 2, with the covering omitted, and showing a slip-joint in the trailing edge strip.

Figure 1:
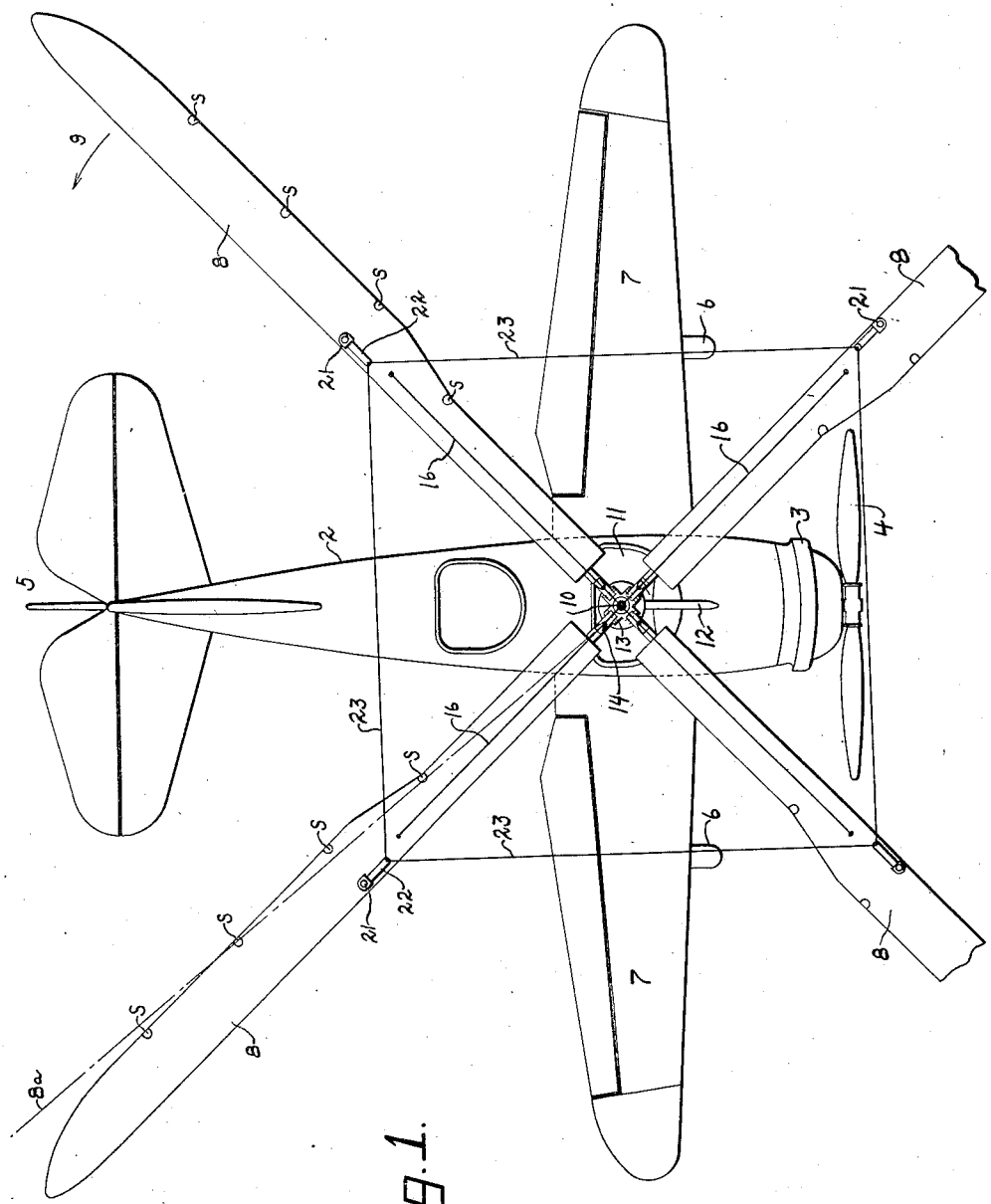
Figure 1 is a plan view of an aircraft with an air-actuated sustaining-winged rotor embodying the present invention, two of the four blades or wings of the rotor being cut off, so as to show the other two in proper scale.

By reference first to Figure 1, it will be seen that I have illustrated an aircraft 2, having engine and propeller 3, 4, empennage 5, landing gear 6, supplemental fixed wings 7, and main rotative sustaining wings 8, which latter are adapted to rotate in the direction of the arrow 9, under the influence of the relative flight wind, about the upright hub or axis structure 10 which is mounted above a cockpit 11 as by means of a plurality of struts or legs 12.

Each rotary wing 8 is mounted on the axis 10, preferably in a position or at an angle such as to ensure autorotative actuation at all times when the craft is in the air, the mounting of the wing being by means of a horizontal pivot 13 and a vertical pivot 14, which may be interconnected by a link or extension block 15 such as shown in Figure 2.

As seen in Figure 1, the wings or blades 8 may be prevented from drooping too far, when at rest, by means of the cables or wires 16; and as seen in Figure 2, they may be prevented from swinging too far on their vertical pivots 14 (particularly under the action of the usual rotor starter or rotor brake, not shown) by means of rubber cushions or bumpers 17, mounted for example between brackets or stop devices 18, 19; brackets 18 being mounted on the extension block 15 and brackets 19 on the main wing spar or tube 20. In flight, the wings normally cone upward slightly, to variable oscillative positions on their horizontal hinges 13, as determined by the centrifugal and lift forces. Their flight movements on their vertical hinges 14, however, may be limited and/or controlled, at least in extremes of oscillation, by means of the cushions 17 and/or by means of the rotative shock absorbing devices 21 (see Figure 1), the latter coming into action when a wing moves to an extreme position, such as shown at 8a, and the actuation of such shock absorbers being by means of arms or levers 22 and cables 23 interconnecting them.

The general construction of the rotary wing can best be seen in Figure 2, from which it will be apparent that the main spar 20, which connects the wing to the pivot pin 14, extends throughout the length of the wing and is, for the most part, parallel by a trailing edge strip 24 and an intermediate strip or stringer 25. A plurality of relatively closely spaced transverse ribs 26 is secured to the longitudinal members 20, 24 and 25, and a suitable covering 27, such as linen or other fabric, forming the aerofoil surface contour is supported by said ribs and the trailing edge strip.

From Figure 3 it will be seen that the nose or leading edge portion of the wing may be stiffened and reenforced by sheet material 28, such as plywood or metal, the fabric being applied externally thereof. The ribs may be secured to the tubular spar 20 by means of collars 29, which may be welded thereon, having flanges 30 to which the ribs are attached as by bolts or rivets 31. At the nose the sheet material 28 may be secured to the ribs as by gluing and nails, or screws 32. Intermediate the spar and the trailing edge, the stringer 25 may be secured to the ribs by gluing and/or by nails 33. At the trailing edge the tip portions 26a of the ribs may be let into the V-shaped metal trailing strip 24 and secured by small rivets 35; the forward upper and lower edges of the strip 24 (which is V-shaped in cross section) being bent together, as at 36, in the zones intermediate the ribs.

In section, it will thus be seen that the wing is given a substantially box-like nose construction, which provides the wing not only with great resistance to air pressure in the zone of greatest pressure, but also produces a considerably greater stiffness as against bending of the wing in the plane of rotation as compared with the stiffness and bendability of the wing in a direction transverse the plane thereof. It will also be seen that the maximum thickness or depth of the wing section is approximately only about one-seventh or one-eighth of the maximum chord, and in any event it is normally no greater in thickness than about one-fifth of the chord. Similarly, it will be seen that the trailing edge strip is of considerable width, in the plane of the wing, so as to provide ample stiffness to resist the "pull" of the fabric, between the ribs, but is very thin in a direction transverse the plane of the wing.

With the foregoing construction, the main spar is located well forwardly in the wing section and is closely adjacent the zones of the sectional center of gravity and the sectional center of pressure; and the neutral axis of resistance in the plane of rotation is located approximately at the line $x$—$x$, which is even a little ahead of the longitudinal axis $z$ of the spar. Thus, while the wing is relatively flexible in a direction transverse its plane (a certain amount of flexibility in that direction being desirable because of the extreme variations in pressure conditions acting in that direction), and relatively less flexible in the direction of its plane, yet the slight deformations of the main strengthening structure, in the plane of rotation, will cause considerable deflection at the trailing edge 24, since said edge is at a considerable distance from the neutral axis $x$—$x$.

Rather than stiffening up the thin or trailing edge portions of the wing to resist such deflections, my invention contemplates provision for accommodating the deflections, both at the intermediate stringer and at the trailing edge strip, as by a series of localized flexing or yielding points.

As seen in Figures 2 and 3, the means for accomplishing this purpose in the wood stringer 25 comprises a series of cuts or interruptions 25a at spaced intervals along said stringer, between pairs of ribs.

As seen in Figures 1, 2 and 4, the means for accomplishing this purpose in the trailing edge strip 24 comprises a series of joints, preferably slip-joints, located at intervals along the trailing edge and indicated in general by the reference character s. Such a slip-joint is preferably made by leaving a gap 24a in the trailing edge strip, and covering the gap by a short piece 37, of similar V-shaped cross section, which may be attached to one free end of the strip 24 as by small rivets 38 and may slide on an adjacent free end of the strip 24.

After the general fabric covering 27 of the wing is in place, a small fabric patch 39 may be doped on, over the slipping portion of the joint, in the zone of the nearest rib; and on top of this, as by sewing, may be applied a thin leather patch 40.

Not only in flight, but also under the influence of the rotor starter before take-off and of the rotor brake after landing, the major oscillations of the wing, moving as a whole, are taken care of by the pivots and cushions at the root end of the wing, whereas the deflections of the wing within itself, in the plane of rotation, are accommodated by the joint devices hereinbefore described. Buckling and breakage of strips and stringers are thus avoided, as well as deformation of the wing surfacing. The slight deformations or wrinkling of the fabric are concentrated at the joints, and where the resilience of the fabric is taxed at those points a reenforcement is provided in the form of an external patch. Other advantages will no doubt be evident to those skilled in the art, and modifications in the construction of the wing and the deflection-accommodating means may be made, without departing from the spirit of the invention.

I claim:—

1. In an aircraft, having powered means of forward propulsion and normally air-actuated means of sustension comprising rotary wings adapted to turn about an upright axis in all styles of operation from high-speed forward flight to vertical descent, wherein the rotary wings are thus subjected to variable pressure forces, variable centering of pressure especially longitudinally thereof, and variable drag and acceleration forces: a rotary sustaining wing of elongated plan form and of a maximum chord at least five times its maximum thickness, the structure of said wing being somewhat flexible in a direction transverse its plane and relatively less flexible in the direction of its plane, and the thickest and stiffest portion of the wing being adjacent the leading edge, means at the wing root for mounting it and including pivot means positioned to accommodate swinging movements of the wing as a whole under the influence of some of said forces, and means at the trailing part of the wing providing for relative longitudinal movement of adjacent portions thereof to accommodate deflections of the wing itself in its own plane, under the influence of some of said forces, the last mentioned means being positioned and constructed to preserve the substantially smooth continuity of the wing surface during flexure of the wing in either plane.

2. An elongated rotatably-mounted wing having a slip-joint in the trailing edge thereof positioned to accommodate relative endwise movement of adjacent portions of said edge.

3. An elongated rotatably-mounted wing having a main longitudinal structure, supplemental longitudinal structure and wing-surface structure both carried by said main structure, and means for accommodating shifting of part of the supplemental structure upon deflection of said main structure under the influence of variable forces acting on the wing in flight.

4. For an aircraft, a sustaining wing of high aspect ratio and of aerofoil section, mounting mechanism at the root end of the wing constituting the major means for securing the wing, the thicker or forward portion of the wing section having a main strengthening structure extending longitudinally of the wing and secured to said mechanism, the thinner or trailing portion of the wing section being supported primarily from said strengthening structure, and a transverse cut in said trailing portion positioned to provide for bending of the wing in its own general plane whereby to obviate substantial deformation of the wing surface and buckling of the wing structure.

5. For an aircraft, a sustaining wing of high aspect ratio and of aerofoil section, mounting mechanism at the root end of the wing constituting the major means for securing the wing, the thicker or forward portion of the wing section having a main strengthening structure extending longitudinally of the wing and secured to said mechanism, the thinner or trailing portion of the wing section being supported primarily from said strengthening structure, and a joint in an edge part of said trailing portion constructed and positioned to accommodate bending of the wing in its own general plane whereby to obviate substantial deformation of the wing surface and buckling of the wing structure.

6. In a rotative wing, a main longitudinal spar with means at the root for mounting it, a plurality of spaced-apart transverse ribs mounted on said spar as against torsional or centrifugal dislodgment, a trailing edge strip carried by said ribs and serving to maintain their relative spacing, covering material supported by said ribs and strip in position to form a smooth external aerofoil contour for the wing, and a longitudinal slip-joint in said strip.

7. A rotative wing of greatly elongated and in large part substantially straight plan formation, having a main longitudinal box-like nose portion of considerable strength and rigidity, a trailing or rear portion of relatively less strength and rigidity, and means providing flexing or yield points at spaced-apart intervals along said rear portion.

8. In a rotative wing, a main longitudinal box-like nose portion of considerable strength and rigidity, a trailing or rear portion of relatively less strength and rigidity, and means providing flexing or yield points at spaced-apart intervals along said rear portion, said last mentioned means including a yieldable trailing edge strip, and an intermediate stringer interrupted at spaced points.

9. In a rotative wing, a main longitudinal box-like nose portion of considerable strength and rigidity, a trailing or rear portion of relatively less strength and rigidity, and means providing flexing or yield points at spaced-apart intervals along said rear portion, said last mentioned means including gaps or joints in the wing structure and means covering over said gaps or joints.

10. A rotative sustaining wing of high aspect-ratio-approximating at least 6 to 1, and of auto-rotational aeroform section, having in the trailing portion thereof means for accommodating yielding or movements of a portion of the wing structure in a direction lying substantially in the general plane of the wing.

11. A rotative sustaining wing of high aspect-ratio approximating at least 6 to 1, and of auto-rotational aeroform section, having in the trailing portion thereof means for accommodating yielding or movements of a portion of the wing structures in a direction lying substantially in the general plane of the wing, and an outwardly smooth protective device covering the said means.

AGNEW E. LARSEN.